(12) United States Patent
Yamashita et al.

(10) Patent No.: US 7,130,909 B2
(45) Date of Patent: Oct. 31, 2006

(54) STORAGE PATH CONTROL METHOD

(75) Inventors: Nobuyuki Yamashita, Yokohama (JP); Tatsundo Aoshima, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 269 days.

(21) Appl. No.: 10/745,158

(22) Filed: Dec. 22, 2003

(65) Prior Publication Data
US 2005/0097243 A1 May 5, 2005

(30) Foreign Application Priority Data
Oct. 7, 2003 (JP) ............................. 2003-347760

(51) Int. Cl.
*G06F 15/173* (2006.01)

(52) U.S. Cl. .................. 709/226; 709/223; 714/38; 714/2; 370/216

(58) Field of Classification Search ................ 709/223, 709/217; 710/38; 714/2, 4; 370/216, 242; 706/226
See application file for complete search history.

(56) References Cited

U.S. PATENT DOCUMENTS

| | | | |
|---|---|---|---|
| 6,640,278 B1 * | 10/2003 | Nolan et al. .................. 711/6 |
| 6,754,679 B1 | 6/2004 | Oheda | |
| 2002/0099914 A1 * | 7/2002 | Matsunami et al. ........ 711/154 |
| 2003/0033346 A1 | 2/2003 | Carlson et al. | |
| 2003/0033398 A1 * | 2/2003 | Carlson et al. ............. 709/223 |
| 2003/0093442 A1 * | 5/2003 | Mogi et al. .................. 707/203 |
| 2003/0191904 A1 * | 10/2003 | Iwami et al. ................ 711/147 |
| 2003/0204597 A1 | 10/2003 | Arakawa et al. | |
| 2004/0230317 A1 | 11/2004 | Kumar et al. | |
| 2004/0243647 A1 * | 12/2004 | Oheda .......................... 707/200 |
| 2005/0044199 A1 * | 2/2005 | Shiga et al. ................. 709/223 |

* cited by examiner

*Primary Examiner*—Abdullahi Salad
(74) *Attorney, Agent, or Firm*—Townsend and Townsend and Crew LLP

(57) ABSTRACT

In volume allocation, the user specifies a volume allocation requirement including parameters regarding availability of paths to select and to set volumes and paths to satisfy the requirement. In the operation, a check is made for not only paths actually set but also paths available at occurrence of path failure to store results of the check in path control information. The information also includes the volume allocation requirement. A path is selected to be set according to the requirement stored in the information.

5 Claims, 8 Drawing Sheets

FIG.3A

82 VOLUME TABLE

| VOLUME ID | STORAGE ID | CAPACITY | STATE |
|---|---|---|---|
| S1V1 | S1 | 10GB | ALLOCATED |
| S1V2 | | 5GB | NOT ALLOCATED |
| S1V3 | | 3GB | NOT ALLOCATED |
| S2V1 | S2 | 10GB | NOT ALLOCATED |
| S2V2 | | 5GB | NOT ALLOCATED |
| S2V3 | | 3GB | NOT ALLOCATED |

83 HOST TABLE

| HOST ID | STORAGE NETWORK CONFIGURATION |
|---|---|
| H1 | NAS,NAS+SAN,FC-SAN,IP-SAN |
| H2 | NAS,NAS+SAN,IP-SAN |

84 HOST PORT TABLE

| HOST PORT ID | HOST ID | TOPOLOGY GROUP ID | STORAGE NETWORK CONFIGURATION |
|---|---|---|---|
| H1P1 | H1 | TG1 | FC-SAN,NAS+SAN_SAN |
| H1P2 | | TG2 | IP-SAN,NAS,NAS+SAN_NAS |
| H1P3 | | TG2 | IP-SAN,NAS,NAS+SAN_NAS |
| H2P1 | H2 | TG2 | IP-SAN,NAS,NAS+SAN_NAS |
| H2P2 | | TG2 | IP-SAN,NAS,NAS+SAN_NAS |

85 STORAGE PORT TABLE

| STORAGE PORT ID | STORAGE ID | TOPOLOGY GROUP ID | STORAGE NETWORK CONFIGURATION |
|---|---|---|---|
| S1P1 | S1 | TG1 | FC-SAN,NAS+SAN_SAN |
| S1P2 | | TG1 | FC-SAN,NAS+SAN_SAN |
| S1P3 | | TG2 | IP-SAN,NAS,NAS+SAN_NAS |
| S2P1 | S2 | TG1 | FC-SAN,NAS+SAN_SAN |
| S2P2 | | TG2 | IP-SAN,NAS,NAS+SAN_NAS |
| S2P3 | | TG2 | IP-SAN,NAS,NAS+SAN_NAS |

88 PATH CONTROL INFORMATION

89 PATH TABLE

| STORAGE ID (891) | VOLUME ID (892) | CAPACITY (893) | STORAGE PORT ID (894) | HOST ID (895) | HOST PORT ID (896) | STATE (897) | STORAGE NETWORK CONFIGURATION (898) | VOLUME ALLOCATION REQUIREMENTS (899) |
|---|---|---|---|---|---|---|---|---|
| S1 | S1V1 | 10GB | | | | CURRENT | | |
| | S1V2 | 5GB | S1P1 | H1 | H1P1 | CURRENT | FC-SAN | 4GB-6GB, BLOCK IMAGE, PRIORITY FOR PERFORMANCE, [H1], THREE OR MORE REDUNDANT PATHS |
| | | | S1P2 | | | STANDBY | FC-SAN | |
| | | | S1P3 | | H1P2 | STANDBY | IP-SAN | |
| | | | | | H1P3 | STANDBY | IP-SAN | |
| | S1V3 | 3GB | S1P1 | H1 | H1P1 | CURRENT | NAS+SAN_SAN | 2GB-3GB, FILE IMAGE, PRIORITY FOR PERFORMANCE, [H1,H2], TWO OR MORE REDUNDANT PATHS |
| | | | S1P2 | | | STANDBY | NAS+SAN_SAN | |
| | | | S1P3 | | H1P2 | CURRENT | NAS+SAN_NAS | |
| | | | S1P3 | | H1P3 | STANDBY | NAS+SAN_NAS | |
| | | | | H2 | H2P1 | CURRENT | NAS | |
| | | | | | H2P2 | STANDBY | NAS | |
| S2 | S2V2 | 5GB | S2P1 | H2 | H2P1 | CURRENT | IP-SAN | 4GB-6GB, BLOCK IMAGE, PRIORITY FOR PERFORMANCE, [H2], THREE OR MORE REDUNDANT PATHS |
| | | | S2P2 | | H2P2 | STANDBY | IP-SAN | |
| | | | S2P3 | | H2P2 | STANDBY | IP-SAN | |
| | | | S2P3 | | H2P1 | STANDBY | IP-SAN | |
| | S2V3 | 3GB | S2P2 | H1 | H1P1 | CURRENT | NAS | 2GB-4GB, FILE IMAGE, PRIORITY FOR COST, [H1,H2], THREE OR MORE REDUNDANT PATHS |
| | | | S2P3 | | H1P2 | STANDBY | NAS | |
| | | | S2P2 | | H1P3 | STANDBY | NAS | |
| | | | S2P2 | H2 | H2P1 | CURRENT | NAS | |
| | | | S2P2 | | H2P1 | STANDBY | NAS | |
| | | | S2P3 | | H2P2 | STANDBY | NAS | |

89S: STORAGE ID, VOLUME ID, CAPACITY
89A: STORAGE PORT ID
89C: HOST ID, HOST PORT ID
89B: STATE, STORAGE NETWORK CONFIGURATION
89D: VOLUME ALLOCATION REQUIREMENTS

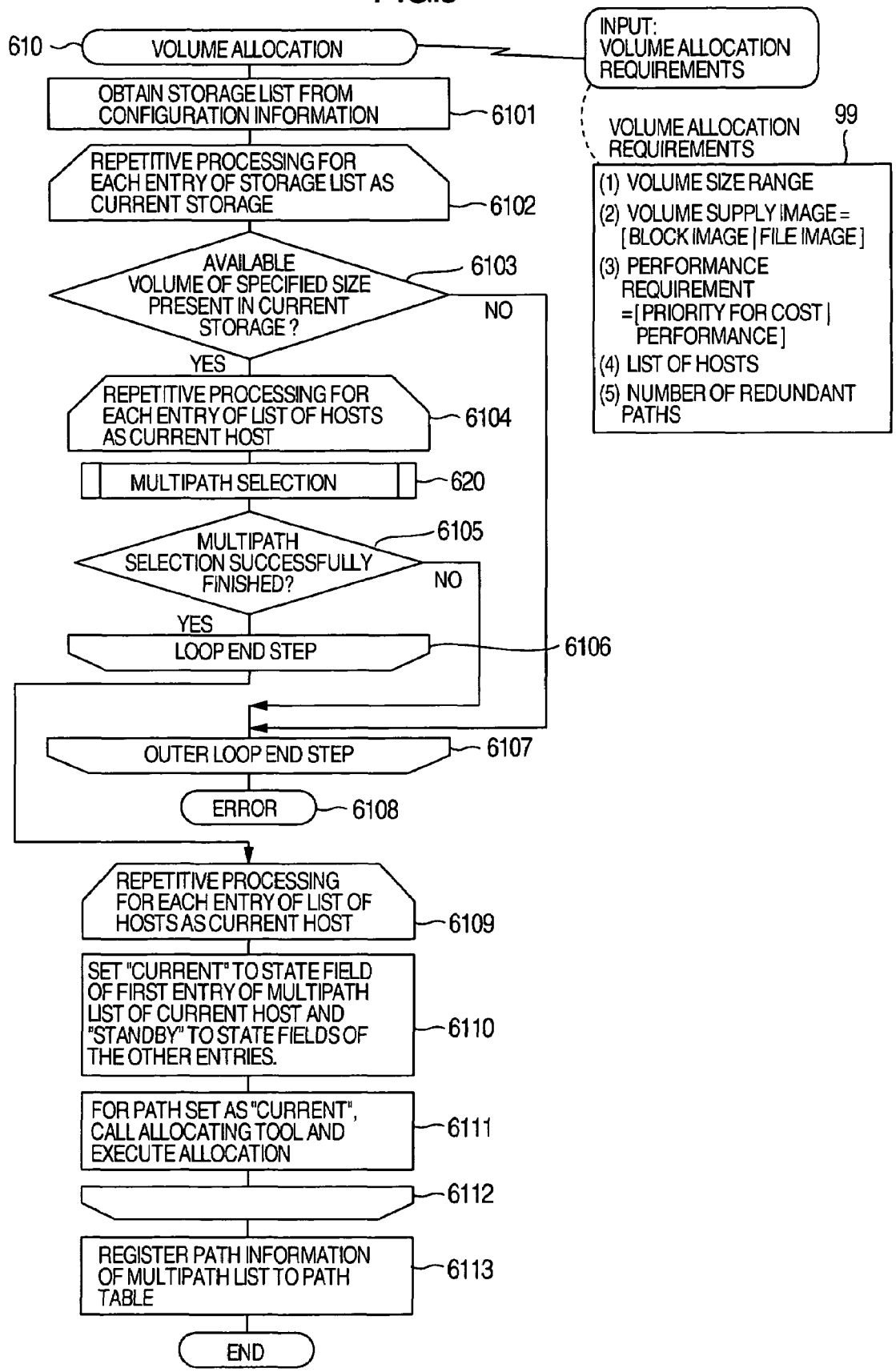

STORAGE PATH CONTROL METHOD

BACKGROUND OF THE INVENTION

The present invention relates to a storage device managing technique to manage operation of a storage device.

The amount of data to be handled by computers is rapidly increasing. To efficiently process such a large amount of data under the above condition, there has been broadly installed a storage connecting method (to be referred to as a storage network configuration hereinbelow) to configure storage networks such as a storage area network (SAN) and a network attached storage (NAS).

The storage area network has a configuration which supplies storage areas (to be referred to as volumes hereinbelow) of a storage device having a large amount of data storage areas to host computers (to be referred to as hosts hereinbelow). The volumes are supplied in block images.

In an ordinary case, the storage area network does not include a common or shared access control function. When two or more hosts access a volume in a shared way, volume access control is required between the hosts. Depending on the network configurations used in such storage area networks, the storage area networks are classified into fiber channel (FC) storage area networks (FC-SAN) and internet protocol (IP) storage area networks (IP-SAN).

In a typical configuration of the FC-SAN, a host bus adapter (HBA) of a host is connected to a port of a storage via a fiber channel switch and and/or a fiber channel hub using a fiber channel cable such as an optical fiber.

A typical configuration of the IP-SAN is implemented on ethernet (including such components as an ether cable, an IP hub, and an IP router)connected to a network interface card (NIC) of a host.

The network attached system has a storage network configuration which supplies a file system under shared access control is supplied via a network to hosts. Using protocols such as a network file system (NFS) and a common internet file system (CIFS), the network attached system can communicate data in a file image with the hosts.

A storage network configuration called "NAS over SAN" includes advantageous features of NAS and SAN. In the configuration, the hosts access files under shared control as in the network attached system. However, the data access method differs therebetween. The NAS over SAN uses shared access control to access meta-data (including a file name, a file size, and hierarchical structure information items of a file system) as in the network attached system. Data blocks are generally transferred via a high-speed path of FC-SAN. In the description below, "NAS over SAN" will be referred to as "NAS+SAN".

In a storage allocation method using the storage area network, storage areas of a system in which storage devices are connected to servers by the storage area network are allocated to users according to requests from the users (reference is to be made to USP Application NO. 2002/0099914).

SUMMARY OF THE INVENTION

In some recent cases, one casing or one unit is used to treat or to accommodate a plurality of storage network configurations such as a storage area network (SAN), a network attached storage (NAS), and a combination thereof (NAS+SAN). In a storage device (to be referred to as a multinetwork configuration storage) corresponding to such storage network configurations, data storage areas are required to be allocated according to each storage network configuration.

Data is transferred through a data transfer path (to be referred to simply as a path hereinbelow) from a volume of the storage device to a host via devices as below.
Volume of the storage device
Port (storage port) of the storage device
Topology device such as an fiber channel switch and an internet protocol hub
HBA and/or NIC (collectively called "host port") of a host
In addition to these devices listed only as examples, any appropriate devices may be used.

In a storage network configuration, these devices are redundantly installed in many cases. In allocation of volumes to store data for important services, a plurality of paths are allocated to cope with path failure depending on cases.

In the volume allocation in this situation, the volumes are not only selected for allocation. That is, depending on requirements for volumes, it is required to appropriately select the volumes for allocation depending on, for example, the storage network configuration in which a volume is opened to a host, devices on a path for the volume, and a redundant layout of the volume.

Particularly, for a multinetwork configuration storage, it is required in the selection and assignment of an alternate path for path failure to include as candidates also a path belonging to a storage network configuration different from that of the original path.

However, if available tools vary between the storage network configurations, it is required that the user first determines the storage network configuration and then allocates available tools corresponding to the storage network configuration.

Even if a tool corresponds to a plurality of storage network configurations, it is required to explicitly specify the storage network configuration in each tool.

As above, the user or the storage manager must understand advantage and disadvantage of each storage network configuration to manually check storage network configurations available in the present system (by use of several tools in some cases) to thereby allocate storages according to results of the check. That is, such a heavy load is imposed on the storage manager.

It is particularly difficult to allocate volumes in consideration of "fail over" between the storage network configurations to guarantee appropriate path redundancy.

In a storage network environment including storage devices corresponding to a plurality of storage network configurations, it is a complex job to select appropriate volumes and paths for allocation thereof in consideration of path failure. Therefore, a heavy load is imposed on the storage manager.

It is therefore an object of the present invention, which has been devised to remove the problem, to provide a technique for the user to allocate volumes without beforehand specifying a storage network configuration. That is, according to an indication from the user to allocate specified volume, paths can be assigned in association with a storage network configuration.

It is another object of the present invention that a volume allocated as above has path availability at least corresponding to a level desired by the storage manager.

It is another object of the present invention that a failure can be automatically detected to set an alternate path for allocation thereof. Or, there is provided a technique to easily select an alternate path for allocation thereof. The alternate path in this situation includes a path of a storage network configuration other than that of the original path.

It is another object of the present invention that even when the configuration is changed, an alternate path can be selected for allocation thereof according to a request from the storage manager at volume allocation.

It is another object of the present invention that when a factor of path failure is removed, the previous path allocation ("fail back") can be easily conducted according to an indication from the storage manager.

To solve the problem according to the present invention, there is provided a storage path control method for use in a storage network system including a plurality of storage network configurations. The method includes the steps of receiving a volume allocation requirement including parameters regarding availability of paths and parameters regarding volumes, reading out information beforehand stored to control paths; determining a volume to be used, according to the parameters regarding volumes thus received; and extracting a path to use the volume thus determined.

To solve the problem according to the present invention, there is provided path control information to control an allocated path (current path), a path for use at occurrence of a failure (standby path), and a path on which a failure has occurred (failed path).

At volume allocation, the storage manager specifies volume allocation requirements including parameters for path availability such that the system selects a volume and a path satisfying the volume allocation requirements and allocates the path and the volume. In the operation, the system checks not only the path to be actually allocated but also paths available at occurrence of failure according to the parameters for the path availability and stores such available paths as standby paths in the path control information. The path control information also stores the volume allocation requirements.

At occurrence of path failure, when the configuration is not changed, an alternate path is selected for allocation thereof according to the path control information. When the configuration is changed, an alternate path is selected for allocation thereof according to the volume allocation requirements stored in the path control information.

After the path failure is recovered, the system restores the original path allocation according to an indication from the user.

Other objects, features and advantages of the invention will become apparent from the following description of the embodiments of the invention taken in conjunction with the accompanying drawings.

BRIEF DESCRIPTION OF THE DRAWINGS

FIG. 3A is a diagram showing an example of a volume table.

FIG. 3B is a diagram showing an example of a host table.

FIG. 3C is a diagram showing an example of a host port table.

FIG. 3D is a diagram showing an example of a storage port table.

FIG. 4 is a diagram showing an example of path control information.

FIG. 5 is a flowchart showing an example of volume allocation processing.

DESCRIPTION OF THE EMBODIMENTS

Figure 1:
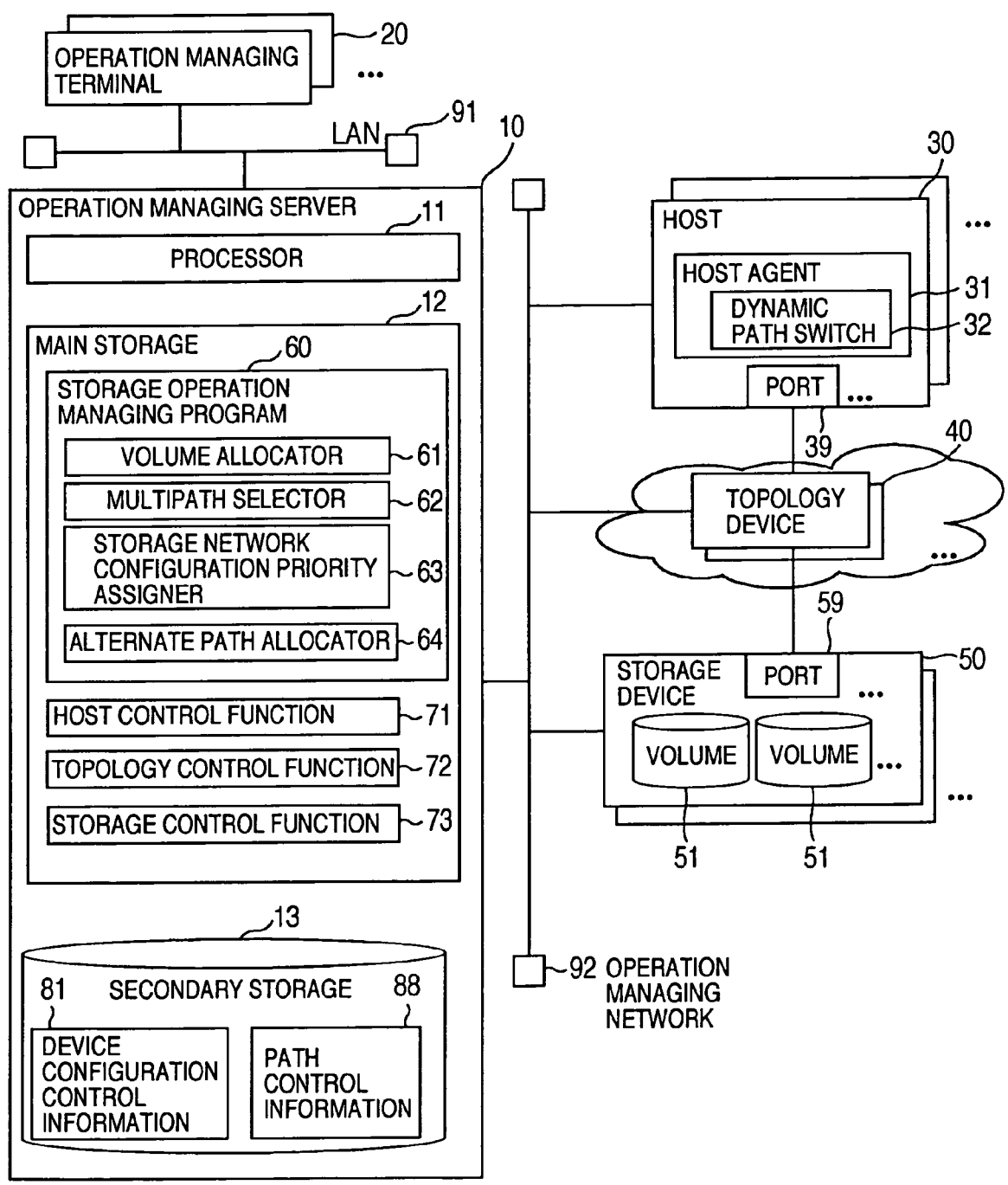
FIG. 1 is a diagram showing a system configuration of an embodiment.

Description will now be given of an embodiment of the present invention by referring to the drawings. The embodiment is configured for operation management of a storage device corresponding to a plurality of storage network configurations. The embodiment employs a volume allocation method in which according to volume allocation requirements from a user, a volume and a path to a host are selected for allocation thereof. The embodiment also uses a technique to guarantee path availability at volume allocation in consideration of a fail over function between different storage network configurations.

First Embodiment

Referring now to FIG. 1, description will be given of an example of a system configuration according to the present invention. The system configuration example commonly applies to the first to third embodiments.

An operation managing server 10 to serve a central function of the embodiment receives a request from an operation managing terminal 20 connected via a local area network (LAN) 91 to the server 10. According to the received request, the server 10 controls a host 30, a topology device 40, and a storage device 50 which are connected via an operation managing network 92 to the server 10. The networks 91 and 92 may be implemented using one network. Or, either one of the networks may be used also for a network of other purposes. It is not necessarily required to specify the purpose of the network.

The operation managing server 10 includes a processor 11, a main storage 12, and a secondary storage 13.

The main storage 12 stores a storage operation managing program 60 including a volume allocator 61, a multipath selector 62, a storage network configuration priority allocator 63, and an alternate path allocator 64. The secondary storage 13 stores device configuration control information 81 and path control information 88. The information layout will be described later.

The host 30 operates application programs (job application programs) for various jobs such as a job of a database management system (DBMS) and a job of a web server. The system may include two or more hosts 30. The host 30 includes one or more ports 39 connected to the topology device 40. The host 30 includes a host agent 31 installed therein. The host agent 31 has a function to execute on the host 30 a request sent from the operation managing server 11 to the host 30. The agent 31 includes a dynamic path switch 32.

The topology device 40 is a device to connect a storage network and includes, for example, a fiber channel switch and a fiber channel hub and an ethernet router and an ethernet hub. The topology device 40 includes a plurality of ports to be connected via a fiber channel cable or an ethernet cable to the host 30 or the storage device 50.

The network connecting devices are only examples. Other appropriate devices may be used to configure a network in another configuration for another protocol.

The storage 50 includes at least one volume 51 allocatable via the topology device 40 to the host 30. The system may include two or more storages 50. The storage 50 includes at least one port 59 connected to the topology device 40. An example of the storage 50 is a redundant array of inexpensive disks (RAID).

The device configuration control information 81 for a device configuration of the host 30, the topology device 40, and the storage 50 includes information obtained respectively via a host control function 71, a topology control function 72, and a storage control function 73 from the associated devices. The secondary storage 13 stores the information 81.

The constituent components such as the storage operation managing program 60, the host control function 71, the topology control function 72, and the storage control function 73, and the agent may be installed as separate programs. A library including some of the functions may be used or a program including a combination of some of the functions may be supplied. Also, these functions may be achieved as independent programs to be executed by mutually different computers.

Specific Configuration Example

Figure 2:
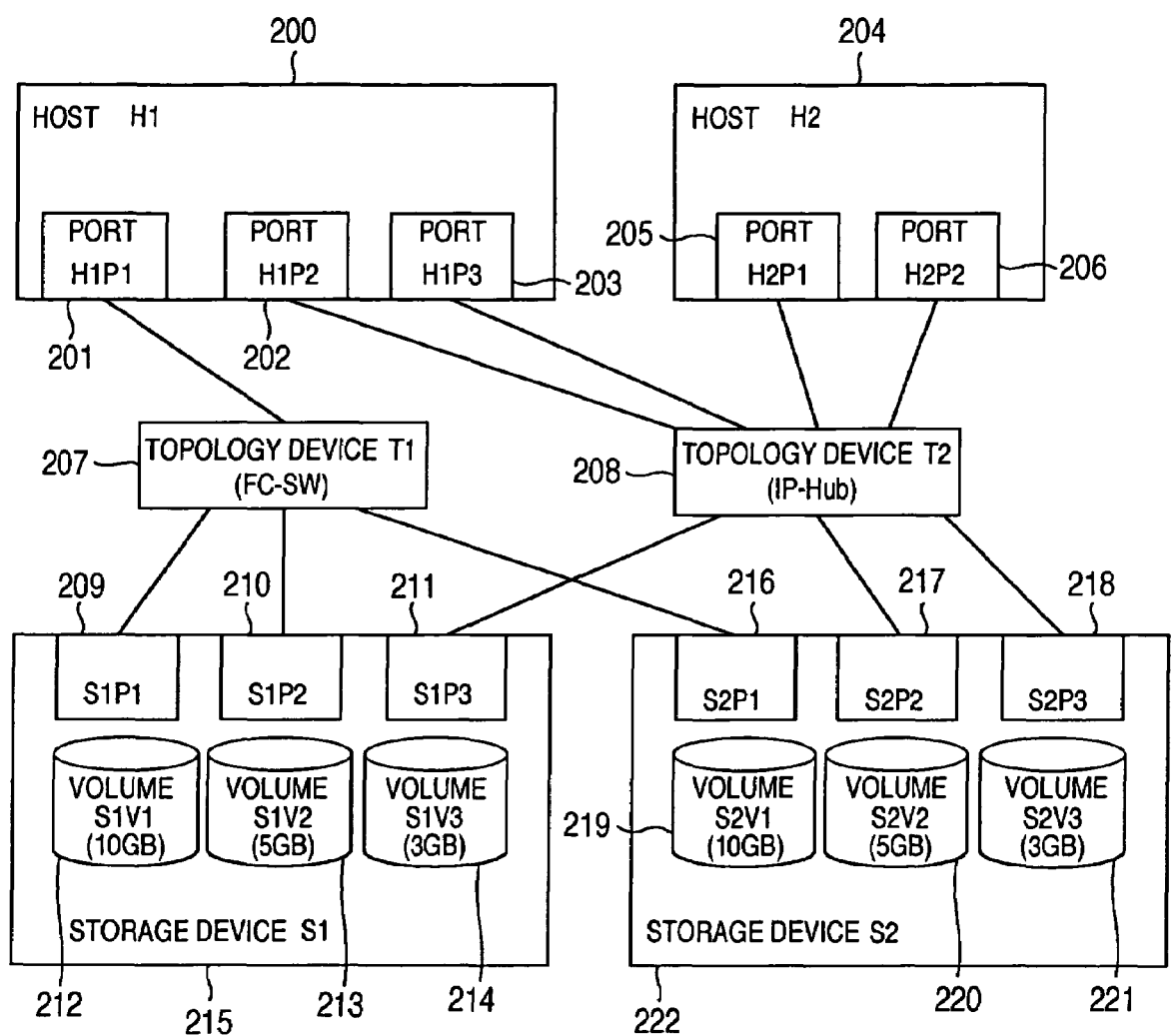
FIG. 2 is a diagram showing a specific example of the embodiment.

FIG. 2 shows for description of the embodiment a specific example of the configuration of devices to be controlled. The system configuration commonly applies to the first to fifth embodiments.

The example includes two hosts, two topology devices, and two storages. The hosts are uniquely identified by identifiers H1 (200) and H2 (204), respectively.

Two topology devices are uniquely identified by identifiers T1 (207) and T2 (208), respectively. Similarly, two storages are uniquely identified by identifiers s1 (215) and S2 (222), respectively.

The host H1 includes one FC port identified by H1P1 (201) and two IP ports identified as H1P2 (202) and H1P3 (203). The port H1P1 is connected to the topology device T1, and the ports H1P2 and H1P3 are connected to the topology device T2.

The host H2 includes two FC ports identified by H2P1 (205) and H2P2 (206). These ports are connected to the topology device T2.

The storage S1 includes two FC ports identified by S1P1 (209) and S1P2 (210) and one IP port identified as S1P3 (211). The ports S1P1 and S1P2 are connected to the topology device T1, and the port S1P3 is connected to the topology device T2.

The storage S2 includes one FC port identified by S2P1 (216) and two IP ports identified as S2P2 (217) and S2P3 (218). The port S2P1 is connected to the topology device T1, and the ports S2P2 and S2P3 are connected to the topology device T2.

The storage S1 includes three volumes identified as S1V1 (212), S1V2 (213), and S1V3 (214). The volumes S1V1, S1V2, and S1V3 are respectively ten gigabytes (GB), 5 GB, and 3 GB in capacity.

The storage S2 includes three volumes identified as S2V1 (219), S2V2 (220), and S2V3 (221). The volumes S2V1, S2V2, and S2V3 are respectively 10 GB, 5 GB, and 3 GB in capacity.

The topology device T1 is an FC switch and is connected to the host H1 and the storages S1 and S2.

The topology device T2 is an IP hub and is connected to the hosts H1 and H2 and the storages S1 and S2.

Database Table Description Method

Referring now to FIGS. 3A to 3D and FIG. 4, description will be given of a configuration of control information in the embodiment using an example of the configuration of FIG. 2.

In the table description method of FIGS. 3A to 3D and FIG. 4, when particular fields include the same value in associated consecutive records, these fields are continuously drawn as a large field or a large frame for easy understanding thereof. The description is given only by way of illustration. That is, the information stored in the tables may be configured in tree structure, associated data items may be connected by a pointer to each other, or any other appropriate description may be used.

Device Configuration Control Information

As shown in FIGS. 3A to 3D, the device configuration control information 81 includes a volume table 82, a host table 83, a host port table 84, and a storage port table 85. The path control information 88 includes a path table 89.

The configuration of fields is only an example. That is, the tables may be constructed in other field configurations. There may be used data structure in which one table is subdivided into a plurality of tables using, for example, a normalizing technique of the relational database (RDB). Or, data structure may be constructed in a converse way, namely, a plurality of tables are combined with each other into one table. The path table 89 may include names of topology devices (such as a switch and a hub) and an identifier of a port of a topology device.

The volume table 82 is used to control information of the volumes 51 in the storage 50. A volume identifier field 821 is a field to store an identifier of each volume 51. A storage identifier field 822 is a field to store an identifier of a storage 50 to which the volume belongs. A capacity field 823 is a field to indicate capacity of the volume and a state field 824 is a field to indicate whether or not the volume is allocated to the host 30.

The host table 83 is used to control information regarding hosts. A host identifier field 831 is a field to store an identifier of a host. A storage network configuration field 832 is a field to store a type of storage network configuration which can be used by the host. The example of FIGS. 3A to 3D indicate that the host H1 can use the network storage configurations including NAS, NAS+SAN, FC-SAN, and IP-SAN and the host H2 can use the network storage configurations including NAS, NAS+SAN, and IP-SAN.

Next, description will be given of a topology group.

A topology means a physical or logical arrangement of networks and devices. For example, a topology using fiber channels includes a configuration of point-to-point type, a configuration of fabric type, and a configuration of arbitrated loop type.

A topology group is determined by a physical connection state between the hosts 30, the topology devices 40, and the storages 50 and zoning specified or set in each topology devices 40.

The zoning is used to determine for a particular server an accessible range of a particular storage. By setting the accessible range, it is also possible to restrict the number of hosts which can access the storage device. Communications between servers can also be restricted by setting the accessible range.

The zoning includes hard zoning and soft zoning.

The hard zoning uses a worldwide name (WWN) of a port of a switch to determine the zoning. The soft zoning uses a worldwide name of a host port or a storage port connected to a switch to determine a correspondence between a zone and a host.

When the zoning is set, information including a group determined by the zoning and a host port and a storage port related to the group is assigned with a unique identifier to control the information for a topology group. As a result, host ports and storage ports assigned with the same topology group identifier can be connected to each other. Host ports and storage ports assigned with mutually different topology group identifiers cannot be connected to each other.

When the zoning is not set, it is assumed that all ports of each switch belong to the same group. It is possible in this case to determine a topology group by establishing a correspondence between the group, host ports, and storage ports.

For a direct connection between ports, it is also possible to assume that a host port and a storage port thus directly connected to each other form a group. A topology group identifier is assigned to control the group using the identifier.

The topology control function 72 executes processing to determine a topology group. The function 72 receives, from the topology devices such as a switch and a hub, information of completion of initial connection of a switch or a hub, information of wiring changes of the switch and the hub, information of zoning set as above, information of zoning changes, and information of port identifiers and worldwide names of respective devices. The function 72 then determines a topology group according to the received information.

The topology group identifier may be determined using information such as "identifier of switch/hub+internal sequential number of switch/hub" at occurrence of events such as completion of connection, wiring change, zoning setting, and zoning change. The topology group identifier may also be determined according to a specification from a user such as a system manager. Or, any other appropriate method may be used to determine the topology group identifier.

By using the topology group as above, it is not required in the determining of a path candidate to check conditions such as whether or not a storage port is directly connected to a host port or whether or not the zoning is beforehand set. According the condition of matching between the topology group identifiers, it is determined whether or not the pertinent components are connected to each other.

In the embodiment, the topology group includes host ports and storage ports. One host port belongs to only one topology group. One storage port belongs to only one topology group.

When a host port and storage port belong to mutually different topology groups, data cannot be transferred therebetween.

According to the concept described above, accessibility between ports can be more easily determined without using detailed information of physical wiring and precise information of the zoning.

The topology control function 72 is used to obtain a topology group. In a simple example of a storage network, when topology devices are not connected to each other and the zoning is not set in each topology device, storage ports and host ports connected to the same topology device constitute one topology group.

In the example of FIGS. 3A to 3D corresponding to the case, the ports connected to the topology device T1 form a topology group assigned with an identifier TG1 and the ports connected to the topology device T2 form a topology group assigned with an identifier TG2.

The host port table 84 is used to control information for the ports 39 installed in the host. A host port identifier field 841 is a field to store an identifier of a port installed in the host. A host identifier field 842 is a field to store an identifier of a host in which the port is installed. A topology group identifier field 843 is a field to store an identifier assigned to the topology group. A storage network configuration field 844 is a field to indicate a storage network configuration available to transfer data between the host and the storage via the port.

The storage port table 85 is used to control information for the ports 59 installed in the storage. A storage port identifier field 851 is a field to store an identifier of a port installed in the storage. A storage identifier field 852 is a field to store an identifier of a storage in which the port is installed. A topology group identifier field 853 is a field to store an identifier assigned to the topology group. A storage network configuration field 854 is a field to indicate a storage network configuration available for data transfer between the host and the storage via the port.

Path Control Information

The path table (FIG. 4) is used to control information for paths. A path is a data transfer route used to open a volume on a storage to a host. A path actually established is determined by a combination of a volume, a storage port, a host port, and a storage network configuration. In other words, to open a volume to a host via first path, there may also exist a second path in which a storage port, a host port, or a storage network configuration is different from the associated component of the first path.

In the recognition of a storage, if the conditions for connection are satisfied, the host can recognize a storage via a plurality of paths or via a network of a different type.

In the embodiment, the path table 89 controls not only the path (current path) actually allocated as a data transfer route but also a path candidate (standby path) to be allocated in place of the current path at occurrence of a failure. This is one aspect of the embodiment.

Description will be given of each field of the path table 89. A volume identifier field 892, a storage port identifier field 894, and a host port identifier field 896 are used to store information items respectively of a volume, a storage port, and a host port constituting a path.

A storage identifier 891 is an identifier of a storage including a volume and a storage port which are on a data transfer route of the path. A host identifier 895 is an identifier of a host (including a host port) to which a volume is opened via the path. A capacity field 893 stores capacity of the volume.

A storage network configuration field 898 stores a storage network configuration of the path. However, for "NAS+SAN", the configuration is controlled by two records. That is, a first record indicates an NAS path, i.e., a data path to transfer meta information of a file and a second record indicates an SAN path, i.e., a data path to transfer block data.

In the storage network configuration field 898 of FIG. 4, the NAS path is indicated as "NAS+SAN_NAS" and the SAN path is indicated as "NAS+SAN_SAN".

As above, the path table 89 controls not only the actually allocated path but also a path as a candidate of an alternate path, the path not being actually allocated. A state field 897 is a field to indicate whether the path is a path (current path) actually allocated or a standby path registered as a candidate of an alternate path.

A volume allocation requirement field 899 indicates volume allocation requirements specified by the user when the volume is allocated. The volume allocation requirements will be described later in detail.

Volume Allocation Requirements

Description will now be given of the volume allocation requirements.

In the embodiment, the volume allocation requirements are a set of parameters specified by the user at volume allocation. It is an aspect of the embodiment that any storage network configuration is not directly indicated. It is also possible for the user to input data from the operation managing terminal 20. The terminal 20 then sends the data to the operation managing server 10 to allocate a volume according to the data thus received. Or, parameters may be received in another method for this operation.

The system tries to select at least one storage network configuration, one volume, and at least one path which satisfy the requirements for volume allocation. If the trial fails, the system notifies a message that the volume allocation is not possible.

The method of the embodiment has another aspect that a requirement for path availability is also included. That is, according to the embodiment, the volume allocating unit selects and sets a storage network configuration, a volume, and a path which keep at the lowest a level specifying alternate path allocatability at path failure.

Next, description will be given of a unit in which by making the user specify a set of five parameters of list 1 below as volume allocation requirements, the unit appropriately selects a storage network configuration, a volume, and a path to conduct volume allocation.

List 1: Volume Allocation Requirement 99
(1) Volume size range
(2) Volume supply image
(3) Performance requirement
(4) List of hosts
(5) Number of redundant paths The first parameter "volume size range" is represented by two numeric values respectively of a lower limit value and an upper limit value of capacity of a volume to be allocated.

The second parameter "volume supply image" is an item to indicate whether the pertinent volume is used in the form of "file image" or "block image".

The third parameter "performance requirement" is used when several storage network configurations are selectable. The parameter indicates which one of the performance and the cost takes precedence in the trade-off therebetween. The parameter specifies either one of the values respectively of "priority for performance" and "priority for cost".

The fourth parameter "list of hosts" indicates a set of hosts to which the pertinent volume is opened. The list includes host identifies enclosed by brackets "{" and "}". For example, when the volume is opened to the hosts with identifiers H1 and H2, the list is described as {H1,H2}. When the volume is opened to only the host with identifier H2, the list is described as {H2}. This is only an example of description. Any other appropriate method may be used to describe the list.

The fifth parameter "number of redundant paths" indicates a specific case of parameters for path availability and specifies the number of paths specifyable for the volume allocation to the host. Thanks to the specification, when failure occurs or when performance is deteriorated in the storage network and it is desired to substitute a path associated with the failure or deterioration for another path, the fifth parameter can be used as one of the indices to select a candidate for the path replacement.

These parameters are described only by way of illustration, and hence other parameter items such as an identifier of a storage may be specified. Also, the parameter items may be specified in other than the order described above. Additionally, any appropriate method may be used to specify the parameter items.

Description will now be given of a specific example of the first embodiment. In the system configuration of FIG. 2, the user specifies parameters of list 2 below for volume allocation requirements and issues a volume allocation request from the operation managing terminal 20. The list 2 is only an example of parameters from the user, and hence other parameters may be specified. For example, a storage identifier may be specified.

List 2: Volume Allocation Requirement 99A
(1) Volume size range=at least 4 GB and at most 6 GB
(2) Volume supply image=block image
(3) Performance requirement=priority for performance
(4) List of hosts={H1}
(5) Number of redundant paths=three or more Having received the volume allocation request from the terminal 20, the server 10 passes control to the volume allocator 61.

Description will now be given of a specific processing method using flowcharts. Particularly, description will be given of a method of describing processing of a loop or an iterative operation in the flowcharts. As shown in FIG. 5, a hexagon with a shorter upper edge of step 6102 or 6104 indicates a starting step of a loop. The hexagonal notation is used to describe a way to process the loop. A hexagon with a shorter lower edge of step 6107 or 6108 indicates an end of the loop. The loop starting hexagon and the loop ending hexagon are used in pair in any situation.

In some cases, pairs of the starting and ending hexagons are used to form a nested loop configuration. In such a case, the associated starting and ending hexagons will be explicitly indicated in the description below.

Volume Allocation Flow

Description will now be given of an example of the volume allocator 610 by referring to the flowchart of FIG. 5.

Volume allocation requirements are inputted to the volume allocator 610. The input data includes information items of the volume allocation requirement 99 specified by the user.

In step 6101, the allocator 610 accesses the device configuration control information 81 to obtain a storage list indicated by a storage identifier 822 of the volume table 82. In the configuration example of FIG. 2, the storages S1 and S2 are entries of the storage list.

Step 6102 is a starting point of a loop. A loop end associated therewith is step 6107. In the loop ranging from step 6103 to step 6106, a check is made for each entry (storage) to determine whether or not the entry satisfies the volume allocation requirement.

If a storage satisfying the volume allocation requirement is present, control leaves the loop via step 6106 to proceed to step 6109. If such a storage is absent, control passes through the loop end of step 6107 to proceed to step 6108. In step 6108, the system outputs, for example, a message indicating absence of a volume satisfying the volume allocation requirement to a screen or a file and terminates the processing with an error indication.

Next, internal processing of the loop will be described. In step 6103, a check is made to determine whether or not an available volume within the volume size range as one of the volume allocation requirements exists in the current storage. This check is conducted by achieving a retrieval operation through the volume table 82 with a condition that the storage identifier 822 is "current storage", the capacity 823 is within the specified range, and the state is "not allocated".

The current storage is determined as follows. In an operation to sequentially refer to entries of a table, a storage identifier included in an entry currently being referred to indicates a current storage.

This also applies to other items such as a host and a storage network configuration. That is, when sequentially referring to entries of a table, an identifier included in an entry currently being referred to indicates a current host or a current storage network configuration.

If a volume satisfying the condition is absent, the current storage cannot satisfy the volume allocation requirement. Therefore, the check is made for a storage next to the current storage.

For the volume allocation requirement 99A, a retrieval operation is conducted for a volume with a condition that the capacity 823 is at most 4 GB and at least 6 GB and the state 824 is "unallocated". If the current storage is S1 (in the first loop operation), the volume S1V2 is retrieved.

When one or more volumes satisfy the condition, an arbitrary one thereof is provisionally assumed as a volume for allocation. Thereafter, a check is made for each entry (host) of the list of hosts to determine whether or not a path satisfying the volume allocation requirement can be selected (in a loop ranging from step 6104 to step 6106). For the volume allocation requirement 99A, the list of hosts is indicated as {H1} and the list includes only one entry. Therefore, H1 is set as a current host to execute only once the loop processing.

In the loop, a check is made to determine whether or not processing of multipath selection 620 is successfully executed. If the processing fails, control passes through an inner loop to proceed to an end of an outer loop (step 6107) to make a check for a subsequent storage. The processing of the multipath selection 620 will be described later by referring to FIG. 6.

If the processing of the multipath selection 620 is successfully terminated, the processing produces a result of a list including at least one path from the current storage to the current host. Only when the processing 620 is successfully terminated for all entries of the list of hosts, control goes to step 6109.

For the specific example of the volume allocation requirement 99A described above, when the multipath selection 620 is first called, S1 and H1 are specified as input parameters respectively of the storage identifier and the host identifier. Details of the processing procedure will be described later. The call is successfully terminated to obtain a list, i.e., a multipath list of four paths as a result.

By adding the volume S1V2 to each entry of the four-path multipath list, the paths are obtained as list 3 below. Each path list includes a storage port identifier, a host port identifier, and a storage network configuration in this order.

List 3: Multipath List 79A
(1) S1V2,S1P1,H1P1,FC-SAN
(2) S1V2,S1P2,H1P1,FC-SAN
(3) S1V2,S1P3,H1P2,IP-SAN
(4) S1V2,S1P3,H1P3,IP-SAN As shown in the list 3 of the multipath list 79A, three or more allocatable paths can be selected between the specified host (H1) and the volume (S1V2) satisfying the condition. Therefore, the multipath selection 620 is successfully terminated. In step 6105, control proceeds to a route of "YES" and then goes through a loop end check for the host to proceed to step 6109.

When a volume and a path satisfying the specified allocation requirements are selected, control goes to step 6109. The system then executes processing to set the volume and the bus.

The system executes processing of a loop (steps 6109 to 6113) for each host. In step 6110 of the loop, the system executes processing for the current host to set "current" to the state of the first entry of the multipath list obtained in the multipath selection 620 and "standby" to the state of each of the other entries.

In step 6111, for the path (the first entry) to which "current" is set in step 6111, an actual path is set using functions such as the storage control function 73, the topology control function 72, and the host control function 71. After the processing is executed for all hosts, information of the multipath list is registered to the path information 89 in step 6113 and then the volume allocation 610 is terminated.

For the specific example of the volume allocation requirements 99A, the loop for each host is a loop only for the host H1. The path of the first entry of the list of the four selected paths is set using the path setting tools (step 6111). In step 6113, records indicated by 89A of FIG. 4 are registered and then the volume allocation is finished.

Multipath Selection Processing Flow

Figure 6:
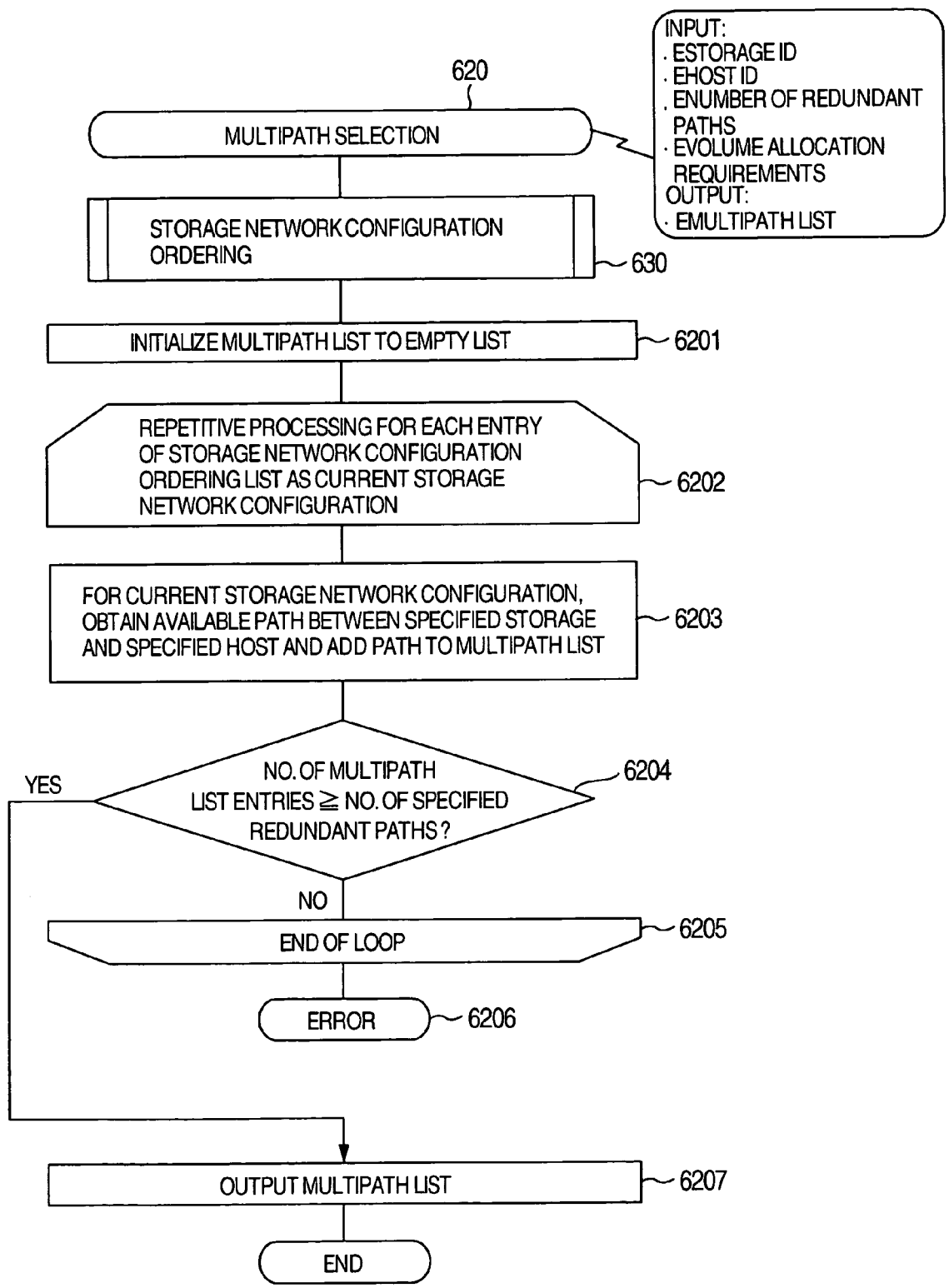
FIG. 6 is a flowchart showing an example of multipath selection processing.

Referring now to FIG. 6, description will be given in detail of the processing of the multipath selection 620. Input items of FIG. 6 are shown only by way of illustration. That is, some items thereof may be omitted or other items may be added thereto.

The multipath selection 620 is processing in which a storage identifier, a host identifier, and the number of redundant paths are received as inputs thereto and then at least the specified number of redundant paths allocatable from the specified storage to the specified host are selected to be output in the form of a list. The storage identifier inputted in the processing 620 of FIG. 6 may be a storage identifier contained in the storage list obtained from the volume table 82 in step 6101 of FIG. 5 or any other input item may be inputted for the storage identifier.

First, the system calls a storage network configuration ordering program 630, which will be described later. As a result of processing of the program 630, there is produced a list (storage network configuration ordering list) in which the storage network configurations are ordered according to the volume allocation requirements.

In step 6201, the multipath list outputted from the processing is initialized to an empty list.

Through steps 6202 to 6205, an iterative operation of a loop is conducted for each entry of the storage network configuration ordering list.

Internal processing of the loop will be next described.

In step 6203, an allocatable path is added to the multipath list for the current storage network configuration. If a new allocatable path is obtained, a new write operation is conducted for the new path. The list 3 described above is only an example of the multipath list. The allocatable paths may be assigned with reference numerals in an order of selection thereof or may be rearranged according to the storage network configuration. Or, any appropriate method may be used to produce the list.

In the processing of step 6203, the check to determine whether or not the path is allocatable is conducted by referring to the host port table 84 and the storage port table 85 of the device configuration control information 81 shown in FIGS. 3A to 3D. Details of the processing method will be described later by referring to a specific example.

In step 6204, a check is made to determine whether or not the number of obtained paths is equal to or more than the number of redundant paths specified as one of the input parameters.

That is, in the loop ranging from step 6202 to step 6205, an available path is sequentially checked for the entries of the storage network configuration ordering list. This operation is repeatedly conducted until the specified number of redundant path becomes less than the number of paths allocatable between the specified host and the storage satisfying the specified condition.

If the number of redundant paths is equal to or more than the number of paths determined as a result of the check for all entries, control passes through the end of loop, i.e., step 6205 to proceed to step 6206. In this case, since the number of allocatable paths is less than that of the specified condition in the path selection, an error is assumed (to output, for example, a warning message indicating occurrence of an error) and the processing is terminated. It is also possible that a list of paths (a list indicating a correspondence between host identifiers, topology device identifiers, and storage identifiers) and the number of paths obtained by the processing of steps 6202 to 6205 are displayed on a screen. A warning message "paths satisfying user's conditions cannot be selected" may also be displayed at termination of the processing.

If the condition is satisfied in step 6204, control leaves the loop at an intermediate point thereof to proceed to step 6207. A multipath list created up to this point is then outputted and the processing of multipath selection 620 is terminated.

For the specific example of the volume allocation requirement 99A, the input includes three parameters, namely, a storage identifier S1, a host identifier H1, and three as the number of redundant paths. When the storage network configuration ordering 630 is called to be processed, a storage network configuration ordering list is resultantly produced as below.

{FC-SAN,IP-SAN}

Therefore, the loop ranging from step 6202 to step 6205 conducts its operation first using FC-SAN as a current storage network configuration. In step 6203, a check is made to determine presence or absence of an allocatable path.

Since a storage port and a host port which have the same topology group identifier can be connected to each other, connectable paths are obtained by referring to the host port table 84 and the storage port table 85.

In other words, a retrieval operation is conducted through the host port table 84 using a condition that the host identifier 842 includes an item equal to the specified host identifier and the storage network configuration 844 includes an item equal to the current storage network configuration. That is, the system extracts entries satisfying the condition from the table 84.

Similarly, a retrieval operation is conducted through the storage port table 85 using a condition that the storage identifier 852 includes an item equal to the specified storage identifier and the storage network configuration 854 includes an item equal to the current storage network configuration. That is, the system extracts entries satisfying the condition from the table 85.

The entries extracted from the host port table 84 and those extracted from the storage port table 85 are combined into a combination table using as combination keys the topology group identifier 843 of the host port table 84 and the topology group identifier 853 of the storage port table 85. The combination table includes combinations of connectable storage and host ports.

"List 4" below is a list including combinations of a storage port identifier, a host port identifier, and a current storage network configuration which satisfy the condition.

List 4
S1P1,H1P1,FC-SAN
S1P2,H1P1,FC-SAN

The combinations listed in the list 4 are registered to the multipath list. At this point, the list includes two entries. Since the specified number of redundant path is three, the result does not satisfy the pertinent condition.

Therefore, in the next operation of the loop ranging from step 6202 to 6205, the path extraction processing is executed using IP-SAN as the current storage configuration to extract paths satisfying the condition. "List 5" is produced as a result of the processing.

List 5
S1P3,H1P2,IP-SAN
S1P3,H1P3,IP-SAN

The result of the list 5 is added to the multipath list. Adding the number of paths obtained before to that above, the total number of paths becomes four. This satisfies the condition, i.e., "number of redundant path is at least three".

Therefore, control goes to step 6207 to produce a multipath which includes the results of path extraction conducted for each storage network configuration to extract entries satisfying the condition. The multipath extraction is hence successfully terminated. In this example, the produced multipath list includes the lists 4 and 5.

Storage Network Configuration Ordering

Figure 7:
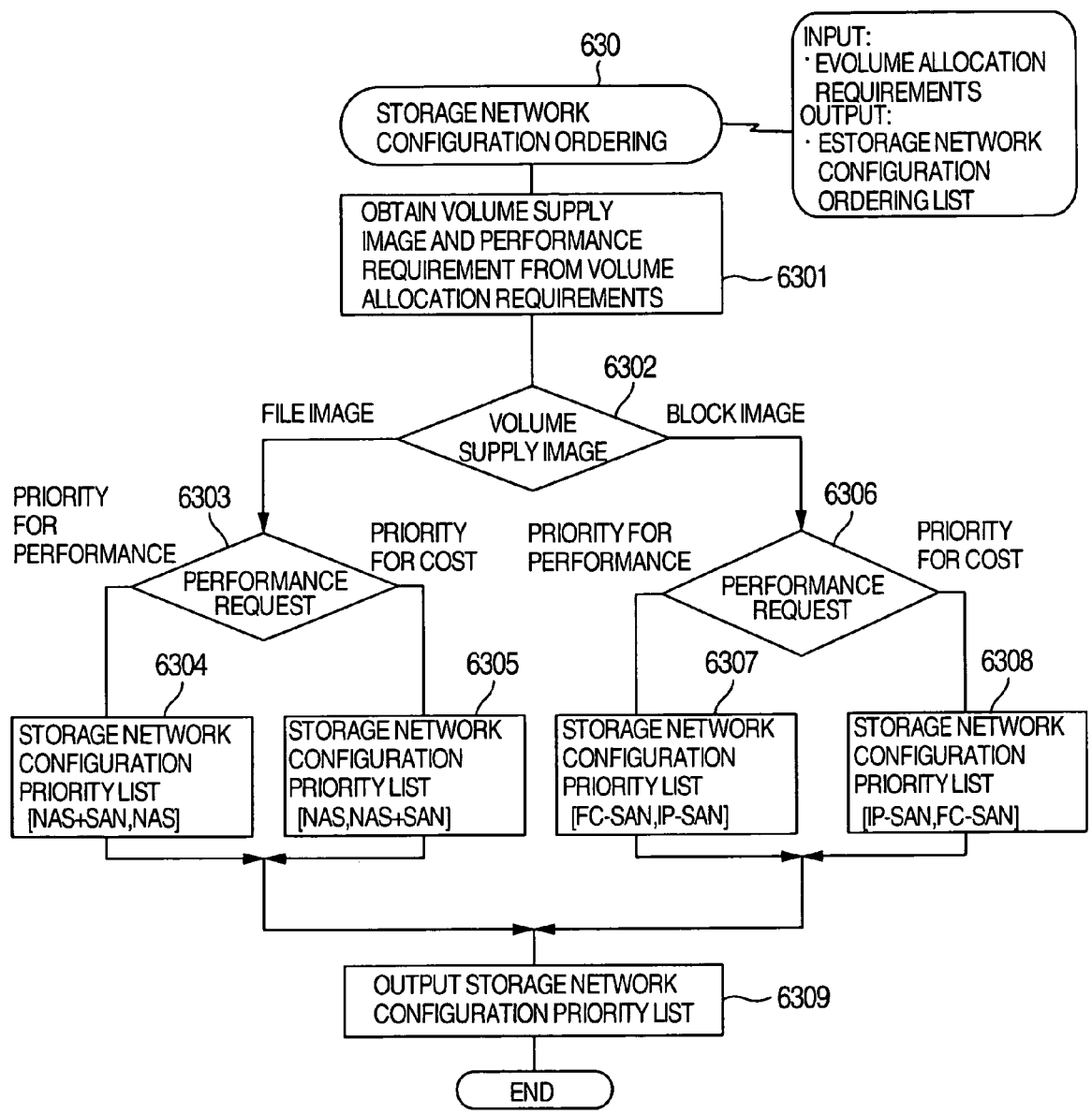
FIG. 7 is a flowchart showing an example of processing of network configuration ordering.

Referring now to FIG. 7, description will be given of the storage network configuration ordering 630. The processing is executed on the assumption described below.

Assumption for Advantage or Disadvantage of Storage Network Configuration

For FC-SAN and IP-SAN, FC-SAN is higher in performance than IP-SAN and IP-SAN is lower in cost than FC-SAN.

For NAS and NAS+SAN, NAS+SAN is higher in performance than NAS and NAS is lower in cost than NAS-SAN.

In the embodiment, the performance and the cost are judged according to the above condition.

In the processing of the storage network configuration ordering 630, the storage network configurations are assigned with priority according to the volume allocation requirements to produce a list thereof.

First, in step 6301, information items of the volume supply image and the performance requirement are obtained from the input item of the volume allocation requirements. The item of the volume supply image is a flag indicating a file image or a block image for the pertinent volume. The item of the performance requirement is a flag indicating whether the priority of the storage network configuration is assigned according to "priority for performance" or "priority for cost".

Control goes to step 6302 with a combination of "volume supply image" and "performance requirement". In step 6302, control goes to step 6303 or 6306. In step 6303, control goes to step 6304 or 6305. In step 6306, control goes to step 6307 or 6308. Through these steps, the priority is assigned to the storage network configurations to produce the ordering list, and then the processing 630 is terminated.

Specifically, when the volume supply image is "file image" and the performance requirement is "priority for performance", control goes to step 6304 to produce a list including NAS+SAN as the first entry and NAS as the second entry.

When the volume supply image is "file image" and the performance requirement is "priority for cost", control goes to step 6305 to produce a list including NAS as the first entry and NAS+SAN as the second entry.

When the volume supply image is "block image" and the performance requirement is "priority for performance", control goes to step 6307 to produce a list including FC-SAN as the first entry and IP+SAN as the second entry.

When the volume supply image is "block image" and the performance requirement is "priority for cost", control goes to step 6308 to produce a list including IP-SAN as the first entry and FC+SAN as the second entry.

The processing method of the storage network configuration ordering 630 of FIG. 7 is an example of implementation of the storage network configuration ordering. Various variations can be considered to achieve the operation described above.

It is also possible to employ a method in which by preparing various different kinds of processing, the input parameters from the user are increased or the parameters for the volume allocation requirements are increased so that an appropriate processing is executed according to the parameters.

Second Embodiment

Description will now be given of a second embodiment of the present invention in which the user issues a volume allocation request from the operation managing terminal 20 in the system configurations shown in FIGS. 1 and 2.

It is assumed in the embodiment that parameters of "list 6" below are specified as volume allocation requirements.

List 6 Volume Allocation Requirement 99B
(1) Volume size range=at least 4 GB and at most 6 GB
(2) Volume supply image=block image
(3) Performance requirement=priority for performance
(4) List of hosts={H2}
(5) Number of redundant paths=three or more The requirement 99B differs from the requirement 99A used in the first embodiment only in that the entry of the list of hosts is changed from H1 to H2. The other items are kept unchanged.

Description will be given of the second embodiment while avoiding description of the same constituent components as those of the first embodiment.

In the volume allocation 610 of FIG. 5, steps 6104 to 6106 form a loop to be processed first with H2 set as the current host. As indicated in the list 6 "volume allocation requirement 99B", a storage identifier of S1, a host identifier of H2, and the number of redundant path of at least three are first inputted to the multipath allocation processing 62.

In the embodiment, an entry of the storage list is obtained from the volume table 82 in step 6101. The storage list includes two entries S1 and S2. The entry S1 is therefore first inputted as a storage identifier.

In the volume allocation requirement 99B of the list 6, the volume supply image is specified as "block image" and the performance requirement is specified as "priority for performance". Therefore, as a result of the processing of the storage network configuration ordering 630, the storage network configuration list includes FC-SAN as the first entry and IP-SAN as the second entry.

Although two entries are shown for the storage network configuration priority in the example of FIG. 6, the number of entries may be increased according to types of data to be communicated, types of networks to be connected, and functions of the networks. The entry of FC-SAN may be included in the same storage network configuration priority list. Or, other items may be included therein.

Steps 6202 to 6205 of the multipath selection 620 of FIG. 6 conduct processing as in the first embodiment to combine the host port table 84 with the storage port table 85 first by setting FC-SAN to the current storage network identifier, S1 to the storage identifier, and H2 to the host identifier.

That is, entries conforming to the conditions "the storage network identifier is FC-SAN, the storage identifier is S1, and the host identifier is H2" are extracted from the tables, i.e., the host port table 84 and the storage port table 85.

Using a topology group identifier in the extracted entry as a key, a correspondence is established between information items such as the host port identifiers and the storage port identifiers.

In the embodiment, a check is made to determine whether or not the host port table 84 includes a record having H2 as a current host identifier. If this is the case, a check is made to determine whether or not the record satisfies the condition. In the record having H2 in the host identifier field 842, the storage network configuration field 844 does not include FC-SAN. This means that there does not exist any multipath to be added to the multipath list.

In subsequent processing of the loop, the table combining operation is conducted by setting IP-SAN to the current storage network identifier (S1 is set to the storage identifier and H2 is set to the host identifier). As a result, paths of "list 7" are obtained as below.

List 7
S1P3,H2P1,IP-SAN
S1P3,H2P2,IP-SAN

The paths obtained by the above processing are added to the multipath list. At this point, the multipath list has two entries and hence the condition of redundant paths (at least three) is not satisfied. Therefore, control passes through step 6205 to terminate the processing with an error. It is also possible at termination to display on a screen a list including the paths of the list 7 and a message "the obtained paths does satisfy the condition of redundant paths".

Thereafter, a condition check is conducted in step 6105 of FIG. 5. The multipath selection 620 has failed, that is, the paths satisfying the volume allocation requirement 99B cannot be obtained for the storage S1. Therefore, control goes to a loop end operation of step 6107.

Control proceeds to step 6102 as a loop start step corresponding to the loop end step 6107. By setting S2 as the current storage, the processing of the loop is executed. In this case, IP-SAN is set as the storage network identifier, S2 is set as the storage identifier, and H2 is set as the host identifier.

Although description of the details of the subsequent processing will be avoided, "list 8" below is obtained as a result of the processing.

List 8: Multipath List 79B
(1) S2V2,S2P2,H2P1,IP-SAN
(2) S2V2,S2P2,H2P2,IP-SAN
(3) S2V2,S2P3,H2P1,IP-SAN
(4) S2V2,S2P3,H2P2,IP-SAN Using entry (1) of the list 8 as the current path, an actual path is allocated, and then the other paths are set as standby path in the path table 88 (records indicated by 89B in FIG. 4).

When any entry is changed in the path table 89, the changed section thereof may be displayed on a screen. It is also possible to store history of entry changes in the path table 89 so that the system manager checks the path entry changes according to necessity.

Third Embodiment

Description will now be given of a third embodiment in which the user issues a volume allocation request from the operation managing terminal 20 in the system configurations shown in FIGS. 1 and 2. In the description, it is assumed that the user specifies parameters of a volume allocation requirement 99C of "list 9" below as volume allocation requirements.

List 9 Volume Allocation Requirement 99C
(1) Volume size range=at least 2 GB and at most 3 GB
(2) Volume supply image=file image
(3) Performance requirement=priority for performance
(4) List of hosts={H1,H2}
(5) Number of redundant paths=two or more Description will be given of difference of the third embodiment with respect to the first embodiment while avoiding description of the same constituent components as those of the first embodiment.

In the volume allocation 610 of FIG. 5, steps 6102 to 6107 constitute a loop to be processed first with S1 set as the current storage. In step 6103, a record is retrieved using the volume table 82. That is, the system retrieves a record for which the storage identifier 822 is S1 (current storage identifier), the capacity 823 is at least two gigabytes and at most three gigabytes (the volume size range of the volume allocation requirement 99C in the list 9), and the state 824 is "unallocated".

As a result of the retrieval, one record for which the volume identifier 821 is S2V3 satisfies the condition. This volume is provisionally set as a volume to be allocated. A check is then made to determine whether or not a path can be set for the volume in conformity with the other items of the volume allocation requirement.

Steps 6104 to 6106 of the volume allocation 610 of FIG. 5 form a loop to be processed first with H1 set as the current host. First input items to the multipath selection 620 are S1 as the storage identifier, H1 as the host identifier, and "two or more" as the number of redundant paths.

The multipath selection 620 calls the storage network configuration ordering 630. In the volume allocation requirement 99C of list 9, the volume supply image is "file image". The performance requirement is "priority for performance".

Therefore, in the flow of the storage network configuration ordering 630, control passes through steps 6302, 6303, and 6204. As a result, a storage network configuration ordering list is obtained as below. This list includes NAS+SAN as the first entry and NAS as the second entry.

{NAS+SAN,NAS}

Therefore, the processing of the loop ranging from step 6202 to 6205 of FIG. 6 is executed first using NAS+SAN as the current storage network configuration.

In this processing, a check is made to determine allocatable paths by combining the host port table 84 with the storage port table 85. For NAS+SAN, the check is made in a method slightly different from that employed for FC-SAN and IP-SAN in the first and second embodiments. In the check for NAS+SAN, a path for NAS and a path for SAN are required to be actually allocated.

That is, the system detects a path of "NAS+SAN_NAS" and a path of "NAS+SAN_SAN" and combines these paths into a path of "NAS+SAN".

Specifically, an entry is retrieved from the host port table 84 using a condition that the host identifier 842 is H1 and the storage network configuration 844 is NAS+SAN_NAS. That is, an entry satisfying the condition is retrieved and is then extracted.

From the storage port table 85, an entry is retrieved using a condition that the storage identifier 852 is S1 and the storage network configuration 854 is NAS+SAN_NAS.

The results obtained as above are combined with each other into a combination table using as combining keys the topology group identifier 843 of the host port table 84 and the topology group identifier 853 of the storage port table 85. The combination table includes the storage and host ports for which the paths can be allocated.

The storage port identifiers, the host port identifiers, and the current storage network configurations satisfying the condition are listed as below.

List 10
S1P3,H1P2, NAS+SAN_NAS
S1P3,H1P3, NAS+SAN_NAS

Subsequently, an entry is retrieved from the host port table 84 using a condition that the host identifier 842 is H1 and the storage network configuration 844 is NAS+SAN_SAN. That is, a search is made through the host port table 84 for an entry conforming to the condition. If there exists such an entry, the system extracts the entry from the table 84.

From the storage port table 85, an entry is retrieved using a condition that the storage identifier 852 is S1 and the storage network configuration 854 is NAS+SAN_SAN.

The results obtained as a result of the processing above are combined with each other into a combination table using as combining keys the topology group identifier 843 of the host port table 84 and the topology group identifier 853 of the storage port table 85. The combination table includes the storage and host ports for which the paths can be allocated.

The storage port identifiers, the host port identifiers, and the current storage network configurations satisfying the condition are listed as below.

List 11
S1P1,H1P1, NAS+SAN_SAN
S1P2,H1P1, NAS+SAN_SAN

In the lists 10 and 11, the number of entries satisfies the condition of the redundant paths (at least two). Therefore, control goes from step 6204 to a branch indicated by "yes" in FIG. 6 to output a multipath list. This terminates the first execution of the multipath selection processing 620.

Since the processing 620 is successfully terminated, control goes from step 6105 to a branch of "yes" in FIG. 5 and finally proceeds to step 6106. In step 6104 as the loop start step corresponding to the step 6106 as the loop end step, the next entry of H2 is set as the current host to conduct the second execution of the loop processing (steps 6104 to 6107).

In step 630 of the multipath selection 620 of FIG. 6, a storage network configuration ordering list including NAS+SAN as the first entry and NAS as the second entry is similarly obtained as below.

{NAS+SAN,NAS}

Therefore, by setting NAS+SAN as the current storage network configuration, a check is made to determine presence or absence of an allocatable path. In the check for an allocatable path of NAS+SAN_SAN, there does not exist any record of the host port table 84 satisfying the condition that the host port identifier 841 is H2 and the storage network configuration 844 is NAS+SAN_SAN. This means that the path of NAS+SAN cannot be allocated.

Next, by setting NAS as the current storage network configuration, a check is made to determine an allocatable path. For NAS, the check is made in the same way as for IP-SAN and FC-SAN. As a result, paths of "list 12" are obtained as below.

List 12
S1P3,H2P1,NAS
S1P3, H2P2,NAS

These paths of the list 12 can be reserved and hence the condition of the redundant paths is satisfied.

As a result of the processing up to this point, that is, when control enters step 6109 of the volume allocation 610, paths of "list 13" below are obtained as paths which can be opened to the host H1. The list 13 is constructed by establishing a correspondence between the results of the lists 10 and 11 and the identifiers of the volumes satisfying the condition.

List 13
S1V3,S1P3,H1P2,NAS+SAN_NAS (*)
S1V3,S1P3,H1P3,NAS+SAN_NAS
S1V3,S1P1,H1P1,NAS+SAN_SAN (*)
S1V3,S1P2,H1P1,NAS+SAN_SAN The paths which can be allocated to the host H2 are obtained in "list 14" as below. The list 14 is configured by relating the list 12 to the identifiers of the volumes confirming to the condition.

List 14
S1V3,S1P3,H2P1,NAS (*)
S1V3,S1P3,H2P2,NAS

In the first processing of the loop ranging from step 6109 to 6112, a path to open a volume to the host H1 is determined in step 6110. For NAS+SAN, a path of NAS+SAN_NAS and a path of NAS+SAN_SAN are set as "current".

That is, the paths indicated by an asterisk in the list 14 are set as "current" and the other paths are set as "standby". The current paths and the standby paths are only described by way of illustration. It is also possible to determine whether or not a path is a current path by use of a numeral or a symbol. Or, the standby paths may be sequentially ordered in an appropriate way. Alternatively, any other appropriate way may be used for the purpose.

When control enters step 6113, the records. indicated by 89C in the path table 89 of FIG. 4 are registered and then the volume allocation 610 is terminated.

Fourth Embodiment

Description will now be given of a fourth embodiment in which the user issues a volume allocation request from the operation managing terminal 20 in the system configurations shown in FIGS. 1 and 2.

It is assumed in the embodiment, that the user specifies parameters of "list 15", i.e., a volume allocation requirement 99D as below.

List 15 Volume Allocation Requirement 99D
(1) Volume size range=at least 2 GB and at most 4 GB
(2) Volume supply image=file image
(3) Performance requirement=priority for cost
(4) List of hosts={H1,H2}
(5) Number of redundant paths=three or more The requirement 99D indicates that the volume supply image is "file image" and the performance requirement is "priority for cost". Therefore, as a result of the processing of the storage network configuration ordering 630, a storage network configuration ordering list is obtained as below. The list includes "NAS" as the first entry and "NAS+SAN" as the second entry.

{NAS,NAS+SAN}

Through the processing of step 6101, a storage list including entries S1 and S2 is obtained using the volume table 82.

In the first processing of the loop ranging from step 6102 to step 6107 for the storages, a check is made to determine whether or not multipath selection is possible for S1. As a result of the check, it is impossible to allocate three or more paths from the storage S1 to the host H1 or H2 using NAS or NAS+SAN.

In the second processing of the loop for the storages, S2 is set as the current storage. As a result, a multipath list is obtained for the host H1 as below.

List 16
S2V3,S2P2,H1P2,NAS (*)
S2V3,S2P2,H1P3,NAS
S2V3,S2P3,H1P2,NAS
S2V3,S2P3,H1P3,NAS Similarly, a multipath list is obtained for the host H2.

List 17
S2V3,S2P2,H2P1,NAS (*)
S2V3,S2P2,H2P2,NAS
S2V3,S2P3,H2P1,NAS
S2V3,S2P3,H2P2,NAS The path indicated by an asterisk in the list 17 is allocated as a current path and the other paths are set as standby paths. The system then registers the records indicated as 89D in FIG. 4 and then terminates the volume allocation 610.

Fifth Embodiment

Description will now be given of a fifth embodiment, specifically, a method in which a device driver (to be called a dynamic path switching device driver hereinbelow) including a function to dynamically conducting a change-over operation between paths is disposed such that when a failure is detected in a path, an alternate path is dynamically allocated.

At occurrence of a failure in a path, there may take place an event in which a volume access issued from an application program (AP) using volumes results in an input/output (I/O) error and the program executes error processing for the failure. Thereafter, the application program is stopped or the operation of the operation range of the program is reduced depending on cases. In this case, a sequence of manual operations are required. For example, the user recognizes the path failure by visually checking an error indication from a system managing tool, makes a check for an alternate path, sets such an alternate path, and changes the access route for the application program to access the volume through the path thus allocated. During the operation, the system service must be stopped or the operation range must be reduced and hence only reduced services are provided.

According to the method of the fifth embodiment, even if a failure occurs in a path associated with the dynamic path switching device driver, an alternate path can be allocated to be substituted for the failed path. Therefore, the system can continuously provide the services.

Description will now be given of an example of a dynamic path switching operation for paths (set according to the volume allocation of the first embodiment).

List 18
S1V2,S1P1,H1P1,FC-SAN(*)
S1V2,S1P2,H1P1,FC-SAN
S1V2,S1P3,H1P2,IP-SAN
S1V2,S1P3,H1P3,IP-SAN In the list 18, the path indicated by an asterisk is a path actually set and the other paths are standby paths. Description will now be given of a case in which the paths are set as above and an application program running on the host H1 accesses the volume S1V2.

First, description will be given of a general procedure for a host to access a volume allocated thereto using, for example, FC-SAN. In the operation of FC-SAN, after a volume is opened via one or more paths to the host, it is required that the host recognizes the allocated volume and then creates a device file for the volume.

The host recognizes the volume in many ways. For example, the user explicitly issues a command to the host so that the host recognizes the volume or the host recognizes the volume at re-start of operation thereof. Or, the host automatically recognizes the volume. The host may recognize the volume in any appropriate way.

The host can create a device file in the volume thus recognized. Depending on systems, the device file is created at recognition of the volume. When one volume is opened to the host via a plurality of paths, the device files are usually created as many as there are paths.

Thereafter, by constructing a file system (FS) in the device file or by setting data storage areas in a database managing system (DBMS), the application program (AP) can use the volume. A component called "logical volume manager" serves as an interface function therebetween. For example, the logical volume manager combines several volumes with each other to virtually show a large volume area and/or subdivides a volume to virtually provide small volume areas according to necessity.

To use the function of the dynamic path switch 32, it is at least required to set a device file. That is, device files corresponding to paths of the respective volumes allocated as FS areas or DBMS areas are not directly used. First, a device file called "pseudo-device file" to drive the dynamic path switching device driver is beforehand set.

Assume that the device file for each path is called "real device file" and the driver for the real device file is called "real device driver" hereinbelow.

A real device driver corresponds to a particular path of a particular volume. A real device driver provides a device control function for a particular path of a particular volume corresponding to a real device file.

On the other hand, a pseudo-device file of the embodiment is a device file which corresponds to a particular volume and which is not limited to any particular path. That is, the path is dynamically changeable for the device file. The dynamic path switching device driver provides a device control function for a particular volume corresponding to a pseudo-device file.

Figure 8:
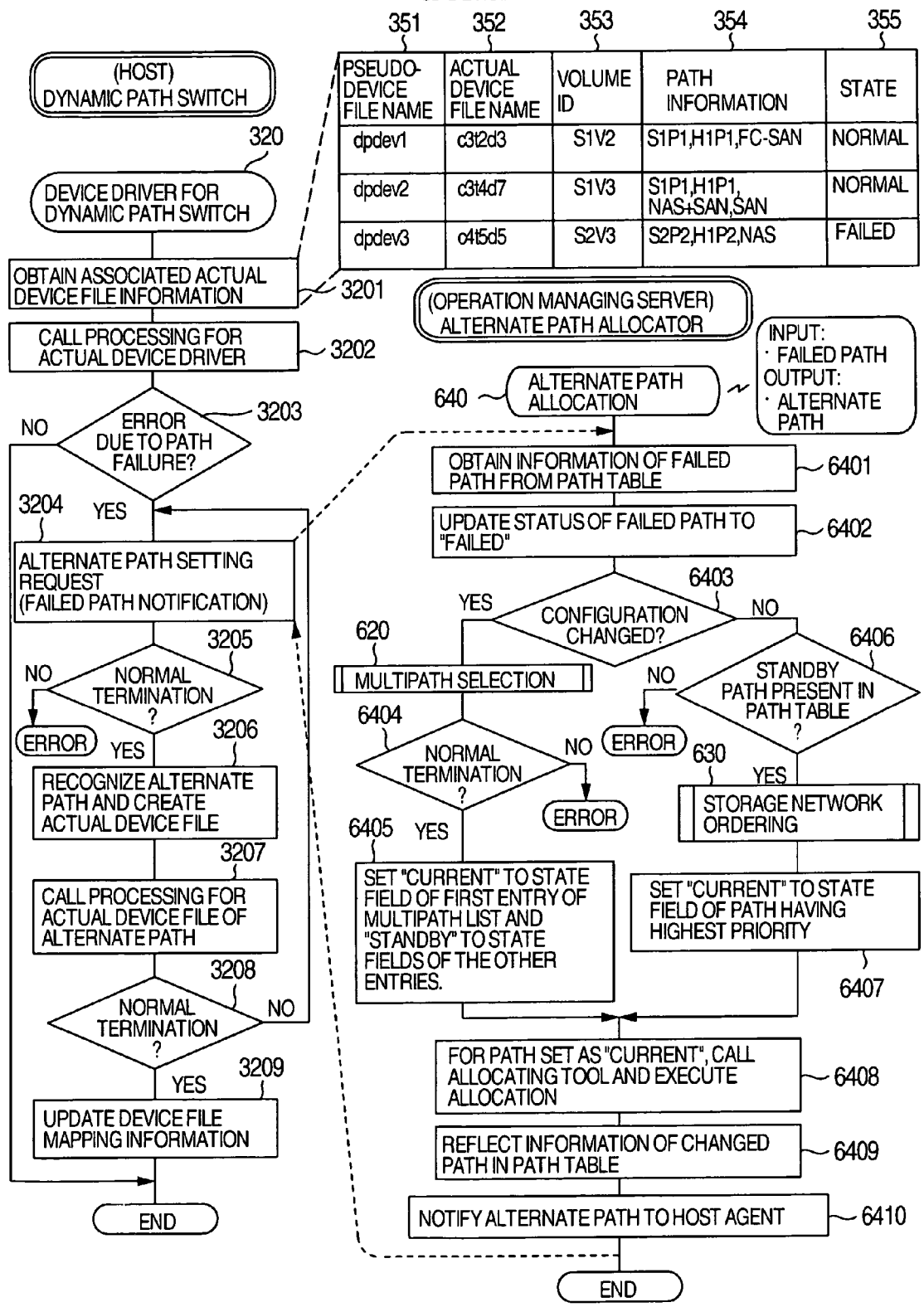
FIG. 8 is a flowchart showing an example of dynamic path switching processing by a host agent and an alternate path setting function of a storage managing server.

A pseudo-device file is set to be assigned to a real device file corresponding to a path to which a volume associated with the pseudo-device file is actually set ("current" is set to the state field 897 of the path control table 88 for the path). For each host, a device file mapping table 35 is used to establish a correspondence between pseudo-device files and real pseudo-device files. FIG. 8 shows an example of the device file mapping table 35 for the host H1.

In the table 35, for example, a pseudo-device file with a pseudo-device file name of dpdev1 corresponds to a volume with a volume identifier of S1V2. In this setting example, a pseudo-device file "dpdev1" is assigned to a real device file "c3t2d3".

To access the volume S1V2, the dynamic path switching function is used. For this purpose, a file system configuration area or a database area is set for the device file "dpdev1", not for the device file c3t2d3.

When an I/O request is issued to a device file, a kernel issues a device control request such as "open", "close", "read", "write", or "block transfer scheduling" suitable for the associated driver corresponding to the device file. When an I/O request is issued to a pseudo-device file, the kernel calls processing of the dynamic path switching device driver as shown in the left-hand side of FIG. 8.

In step 3201, the system obtains information of an associated real device file from the device file mapping table 35 and then calls in step 3202 processing associated with the real device driver.

For example, when an open request is issued to the volume S1V2, an open request is issued to the device file "c3t2d3".

As a result of the processing, if any error does not occur due to path failure, control goes to a branch of "no" in step 3203 to terminate the processing. Control goes to step 3203 also when the processing of the device driver is normally terminated. Even at abnormal termination due to an error, if the error is caused by other than a path failure (for example, if the error is a parity check error), the processing is terminated (with an indication of the error). That is, if the path is normal, the dynamic path switching device driver passes control simply to the real device driver. At termination, it is also possible to display a message such as "pass failure is not detected and pass switching is not conducted".

In other cases, for example, at occurrence of an error of an event in which the pertinent device is not detected, step 3204 and its subsequent steps are executed to try dynamically setting an alternate path.

In step 3204, the dynamic path switch 32 of the host uses a communicating function to the operation managing server 10 to pass control to an alternate path allocator 64 with input parameters including information items of the failed path such as the volume identifier 353 and the path information 354 of the device file mapping table 35.

It is assumed in this situation that the parameters necessary for the dynamic path switching device driver of the dynamic path switch 32 to communicate with the operation managing server 10 are appropriately set in advance. For example, the parameters may be set when the dynamic path switching device driver is set up or may be set by the system manager in advance.

In the processing of the alternate path allocator 64 (shown in the right-hand side of FIG. 8), the system calls dynamic path switch processing 640.

In step 6401, according to the path information received as input items, the system obtains information regarding the path from the path table 89. When control is passed to step 6402, the state 897 of the path is "current". This state is changed to "failed" to indicate a failed state. A check is then made to determine whether or not the storage network configuration has been changed. In step 6403, control branches according to a result of the check to determine presence or absence of the change in the storage network configuration.

If the storage network configuration has not been changed, control goes to step 6406. In this step, a check is made through the paths having the same volume identifier and the same host identifier as those of the inputted path (the failed path) to detect a path in the standby state. If such a path is not detected, the condition that the setting of an alternate path has failed is notified via the communication function to the host having called the processing 640. The processing is then terminated. It is also possible at notification to display on a screen a system manager message to the system manager, for example, "failed path: S9P9-H9P9-FC-SAN alternate path: none".

If there exist paths in the standby state as a result of the check described above, the storage network configuration ordering 630 is executed.

In step 6407, a path having highest priority is selected from the paths, and the state of the path is changed from "standby" to "current".

Control returns to step 6408. The system calls an appropriate setting tool for the path set to "current" as above to conduct a path setting operation and then reflects the change of the associated path in the path table 89 (step 6409). The system notifies the resultant path information via the communication function to the host and then terminates the processing.

For the specific example of the list 18 (the paths set according to the volume allocation in the first embodiment), {S1V2,S1P2,H1P1,FC-SAN} is set as an alternate path.

If the configuration change is detected, control goes to the branch of "yes" in step 6403 to call the multipath selection 620. The multipath selection is called with input parameters including the volume allocation requirement 899 obtained from the path table 89.

That is, by applying the volume allocation requirement used at volume allocation to the new system configuration, the path selection is conducted. When the processing of the multipath selection 620 is finished, control goes to step 6404.

In step 6405, as in the volume allocation 610, the paths thus obtained are assigned with "current" or "standby".

Step 6408 and subsequent steps are used to execute similar processing. In step 6408, for a path (alternate path) set to "current", a setting tool function is called to conduct an alternate path setting operation.

In step 6409, information items of changed paths are reflected in the path table 89. In step 6410, the operation managing server 11 notifies the alternate path to the host agent 31.

Control returns to step 3204 of the dynamic path switching device driver 320. In step 3205, a check is made to determine a return value for termination.

If the check indicates other than normal termination (for example, control returns to step 3204 after error termination in step 6404 or 6406), it is assumed that the setting of an alternate path has failed. The system updates the state 355 of the device file mapping table 35 to "failed" and then executes post-processing necessary for the I/O error to terminate the processing.

If the check results in normal termination, step 3206 is executed for an alternate path obtained as an output from the processing. That is, the system recognizes the alternate path, creates a real device file, and then issues a device control request for the real device file of the alternate path. If this operation fails, control goes from step 3208 to step 3204 to execute again the processing by setting the alternate path as a failed path.

If the device control request to the real device driver is normally terminated, it is confirmed that an I/O operation can be conducted via the alternate path. Therefore, the path assigned as an alternate path up to this point is set as a new current path. That is, in step 3209, the real device file 352 and the path information 354 of the device mapping table 35 are updated and the processing is terminated.

Of the information (the device mapping table 35) including a correspondence between pseudo-device files and real device files, a real device file and a path can be dynamically changed according to a state of the path such as occurrence of a failure, an amount of load, and an I/O ratio of the pertinent port. In other words, when a volume is used by specifying a pseudo-device file, a real device file and a path can be changed according to the state of the path without any request for a change from the user. Therefore, the system manager can also reduce human power for path control.

After the cause of the path failure is removed, for example, after an interrupted cable is substituted for a new cable, it is possible to change the state of the path from "failed" to "standby" to thereby increase usability of the path. That is, even when a path cannot be used due to a failure, if the path failure is removed, the path can be set to an available state.

As above, even after the recovery of path failure, the alternate path can be set as a current path to be continuously used without any functional problem. However, when the original current path thus recovered is advantageous in performance, the user can indicate operation for "fail back". That is, the original current path set as "failed" at the point of time is set again to "current" and the original standby path set as "current" at the point of time is set again to "standby". In this situation, it is also possible to receive a fail back request from the user to conduct a path switching operation according to the request.

For example, the operation managing server 11 collects information from switches, ports, and hosts to determine whether or not the path failure has been removed. It is also possible that if the path failure on a path previously used as a current path has been removed, a path switching operation is conducted to substitute the path presently used as a current path for the path from which the failure has been removed.

Other methods may also be appropriately used. For example, it is also possible to display on a screen a message of removal of the path failure such as "failure is removed from the path "storage ID-storage port ID-topology device port ID-host port ID". In response thereto, the user inputs an item indicating whether or not a path switching operation from the path in use to the path from which the failure has been removed is required. According to the indication, the path switching is conducted when necessary.

According to the method described above, when a failure occurs on a path of a volume allocated by the volume allocation, there exist alternate path candidates greater in number than the redundant paths specified by the volume allocation requirement. Therefore, the path usability is guaranteed according to the volume allocation requirement.

Even when the dynamic path switching device driver cannot be disposed for the hosts, the advantage of simple alternate path selection and setting can be achieve by disposing an interface to execute by a command the alternate path setting 640 shown on the right-hand side of FIG. 8.

In the description of the embodiment, the volume is opened to a single host. However, even when the volume is opened to a plurality of hosts, each host can cope with the path failure in an individual way. This means that any particular operation such as an operation to establish synchronization between the hosts is not required.

As described in detail above, by issuing a volume request with specification of a volume allocation requirement including parameters of path availability, the storage manager can easily allocate and set volumes having high path availability without particularly specifying the storage network configuration.

At occurrence of failure on a path for a volume allocated in the above method, an alternate path can be set in an automatic way or in quite a simple way. After restoration of such path failure, it is possible to easily establish setting to restore the original path according to necessity.

These advantages reduce the operation managing cost for the storage manager.

By issuing a volume request with specification of a volume allocation requirement including parameters regarding path availability, the storage manager can easily allocate and set volumes and can easily set paths for storages.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage path control method for use in a storage network system including a plurality of storage network configurations, comprising:
   receiving a volume allocation requirement including parameters regarding availability of paths;
   reading out device configuration control information beforehand stored;
   determining a volume to be used, according to the volume allocation requirement and the device configuration control information;
   extracting device information from the device configuration control information to satisfy conditions of parameters regarding the availability of paths according to the volume determined by the volume determining step, the device configuration control information, and the volume allocation requirement;
   creating path control information according to the device information extracted from the device configuration control information;
   extracting, in the extraction of device information from the device configuration control information, a host port identifier, a storage port identifier, and a storage identifier from the device configuration control information to satisfy conditions of parameters regarding the availability of paths;
   setting, as a path, information including the host port identifier, the storage port identifier, and the storage identifier with a correspondence established therebetween;
   storing the path in the path control information;
   treating, as one path in the path control information, information including a host port identifier, a storage port identifier, and a storage identifier with a correspondence established therebetween;
   registering, when the path control information includes a plurality of paths, state information of one of the paths as a current path in the path control information and registering state information of each remaining one thereof as a standby path in the path control information;
   registering, when failure occurs in the path registered as a current path, the state information of the current path as "failed" in the path control information and registering the state information of one of the standby paths as "current" in the path control information; and
   conducting a switching operation by substituting the path set to "current" for the path in the failed state.

2. A storage path control method according to claim 1, further comprising:
   making a check, when failure occurs in the path registered as a current path, to determine whether or not a change exists in the network configuration; and
   creating, when a change exists in the network configuration, path control information again and conducting a path switching operation according to the path control information thus created.

3. A storage path control method according to claim 2, further comprising:
   receiving, when the failure of the path in the failed state is removed after the path switching operation is conducted, a fail back request from a user;
   registering the state information of the path released from the failed state as "current" in the path control information;
   registering, when the fail back request is received, the state information of the path being used as a current path as "standby" in the path control information and registering the state information of the path released from the failed state as "current" in the path control information; and
   conducting a path switching operation according to the path control information.

4. A storage path control method according to claim 1, further comprising defining the parameters regarding availability of paths by use of combinations each including a storage port and a host port including in a path to be set when a volume associated therewith is opened to the host.

5. A storage path control method according to claim 1, wherein the volume allocation requirement includes one selected from a condition regarding size of a volume to be allocated, a list including at least one host to which the volume is opened, an index indicating whether a supply image of the volume is a block image or a file image, an index indicating whether the volume and a path are retrieved according to a condition that performance takes higher priority or according to a condition that cost takes higher priority, and a minimum value of redundant paths settable for all hosts to which the volume is opened.

* * * * *